United States Patent

[11] 3,605,091

[72] Inventor Shih Y. Tong
Middletown, N.J.
[21] Appl. No. 859,107
[22] Filed Sept. 18, 1969
[45] Patented Sept. 14, 1971
[73] Assignee Bell Telephone Laboratories, Incorporated
Murray Hill, N.J.

[54] FEEDBACK ERROR CONTROL ARRANGEMENT
20 Claims, 2 Drawing Figs.

[52] U.S. Cl. 340/146.1, 178/23 A
[51] Int. Cl. G06f 11/10, G08c 25/02, H04l 1/10
[50] Field of Search 340/146.1; 235/153; 178/23

[56] References Cited
UNITED STATES PATENTS

| | | | |
|---|---|---|---|
| 3,001,017 | 9/1961 | Dirks | 340/146.1 X |
| 3,001,018 | 9/1961 | Van Dalen | 340/146.1 X |
| 3,228,000 | 1/1964 | Collis | 340/146.1 |
| 3,242,461 | 3/1966 | Silberg, et al. | 340/146.1 |
| 3,402,389 | 9/1968 | Koontz | 340/146.1 |

*Primary Examiner*—Eugene G. Botz
*Assistant Examiner*—Charles E. Atkinson
*Attorneys*—R. J. Guenther and Kenneth B. Hamlin

ABSTRACT: A feedback error control arrangement for data transmission systems which have both forward and reverse channels is disclosed. Parity check digits for an information message are generated at a transmitting terminal and stored there while the information message only is transmitted via the forward channel to a receiving terminal. At the receiving terminal, parity check digits for the information message are again generated and sent back via the reverse channel to the transmitting terminal where they are compared with the parity check digits stored. If the parity digits agree, the next information message is transmitted. If they disagree, the first information message is retransmitted and a record is kept of the position in the data train of the retransmitted message. After all information messages have been sent, the record information is transmitted. Upon receipt of this information, the receiving terminal rewinds the tape and in accordance with the record information, sequentially locates and erases the incorrect messages.

INVENTOR
S. Y. TONG
BY R C Lipton
ATTORNEY

FEEDBACK ERROR CONTROL ARRANGEMENT

BACKGROUND OF THE INVENTION

1 Field of the Invention

The present invention relates to feedback error control arrangements for data transmission systems.

2 Prior Art

The need for accurate transmission and processing of digital data is well recognized in such areas as telegraphy, telephony, and computer and automation technology. Most often, such digital data is represented or coded into sequences of binary signals (hereafter referred to as bits). Each position in such sequence or code word consists of a bit "0" or "1", the different code work permutations of bits representing different items of information.

Methods of improving the accuracy of transmission of data may be broadly classified as (1) forward-acting error correction and (2) error detection and retransmission. The first method generally consists of encoding the data to be transmitted into special code words which include redundant bits sometimes called error check bits. If the number of errors in a received word does not exceed the so-called error-correcting ability of the code, then the received word can be processed to determine specifically what bit positions were received in error. From this determination, the received word can be properly corrected. Examples of such codes are discussed in detail in "Error-Correcting Codes" by W. W. Petersen, The M.I.T. Press and John Wiley & Sons, 1961.

The second general method of improving the accuracy of transmitted data—error-detection and retransmissions—may consist simply of the appending of a single bit to each code word to be transmitted so as to give each word an even number of "1's" (or alternatively an even number of "0's"). Each code word would then be considered as having even parity. If an odd number of errors (transmuting a "1" to a "0" or vice versa) occurred in transmission, the received word would be detected as having odd parity rather than the expected even parity, thus indicating that error(s) had occurred. Upon detection of an error, the receiving end would signal the transmitting end to retransmit the erroneously received word.

An alternative method of error detection and retransmission to that described above consists of generating parity check digits for each information message to be transmitted and then storing the parity check digits while transmitting only the information message. At the receiving terminal parity check digits for the information message received are again generated and sent back to the transmitting terminal where they are compared with the parity check digits there stored. If the parity check digits agree, the next message is transmitted. If they disagree, the information message from which the parity check digits were generated is retransmitted preceded by a special flag character indicating that this is a retransmitted message. Upon receipt of this flag character, the receiving terminal discards the previously received message and substitutes the newly received transmitted message therefor.

With the last described arrangement, it is, of course, necessary to have decoding apparatus to decode the special flag character to determine if a retransmitted message is being received. Furthermore, one of the code characters of the code being utilized must be "set aside" to be the special flag character. Finally, if the special flag character were transmitted erroneously, or if a retransmitted message were found to be in error, an additional and different flag character would have to be provided to indicate to the receiving terminal that either the just-received flag character or the just-received retransmitted message were in error. Likewise, a third, a fourth, etc. flag character might also have to be provided.

SUMMARY OF THE INVENTION

In view of the above-described prior art arrangements, it is an object of the present invention to provide an improved and inexpensive error detection and retransmission arrangement.

It is another object of the present invention to provide such an arrangement which is especially suitable for source-to-tape transmission systems.

It is still another object of the present invention to provide an arrangement in which flag characters need not be transmitted with retransmitted messages.

These and other objects of the present invention are realized in a specific illustrative system embodiment which utilizes the above last-described prior art arrangement, except that flag characters are not sent with retransmitted information messages, but rather indications of the positions of the erroneous information messages in the data stream (as determined by the comparison of the parity check digits) are generated and stored at the transmitting terminal. These indications will hereafter be referred to as indication messages. After all information messages have been encoded and transmitted, an END-OF-MESSAGE signal is transmitted indicating the end of the information messages. The indication messages are then encoded into code words having information and parity check digit portions, just as were the information messages, and transmitted to the receiving terminal. If the parity check digits of one of the encoded indication message blocks do not match, then that block is retransmitted. Transmission continues until all indication messages have been encoded and correctly transmitted.

After the information and indication messages have been received at the receiving terminal and stored, e.g., in a tape unit, the indication messages are read from the tape unit into a decoder. The decoder determines from the indication messages the positions on the tape of the erroneous information blocks. As the tape is rewound, the decoder causes the erroneous blocks to be erased from the tape. Thus, after rewinding, only correct information will be stored on the tape. This same correction procedure could, of course, be used if the receiving terminal storage unit were other than a tape unit. In such a case, the received information could, for example, be read from the storage unit (whatever type it was), corrected, and read back into the unit.

BRIEF DESCRIPTION OF THE DRAWINGS

A complete understanding of the present invention and of the above and other objects and advantages thereof may be gained from a consideration of the following detailed description of a specific illustrative embodiment presented herein below in connection with the accompanying drawings, in which.

DETAILED DESCRIPTION

Figure 1:
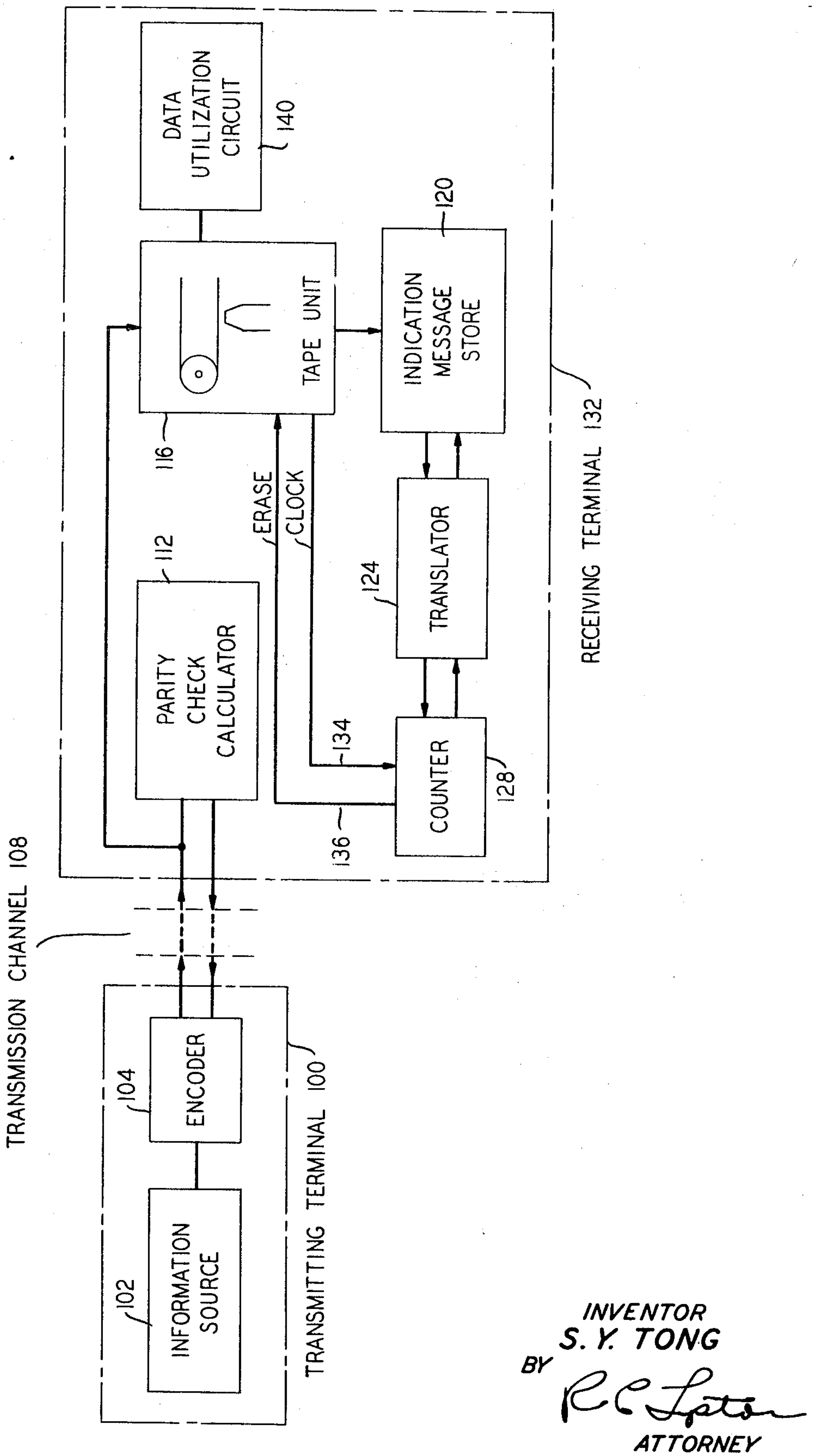
FIG. 1 shows a generalized illustrative error-detection and retransmission system made in accordance with the principles of the present invention.

In FIG. 1, there is shown a transmitting terminal 100 connected via a forward and reverse transmission channel 108 to a receiving terminal 132. The transmitting terminal 100 includes a source of information messages 102 connected to an encoder 104. Information messages are applied by the source 102 to the encoder 104 which encodes the messages into code words including information blocks and parity check blocks. An illustrative implementation of the encoder 104 is shown in FIG. 2 and will now be described.

Figure 2:
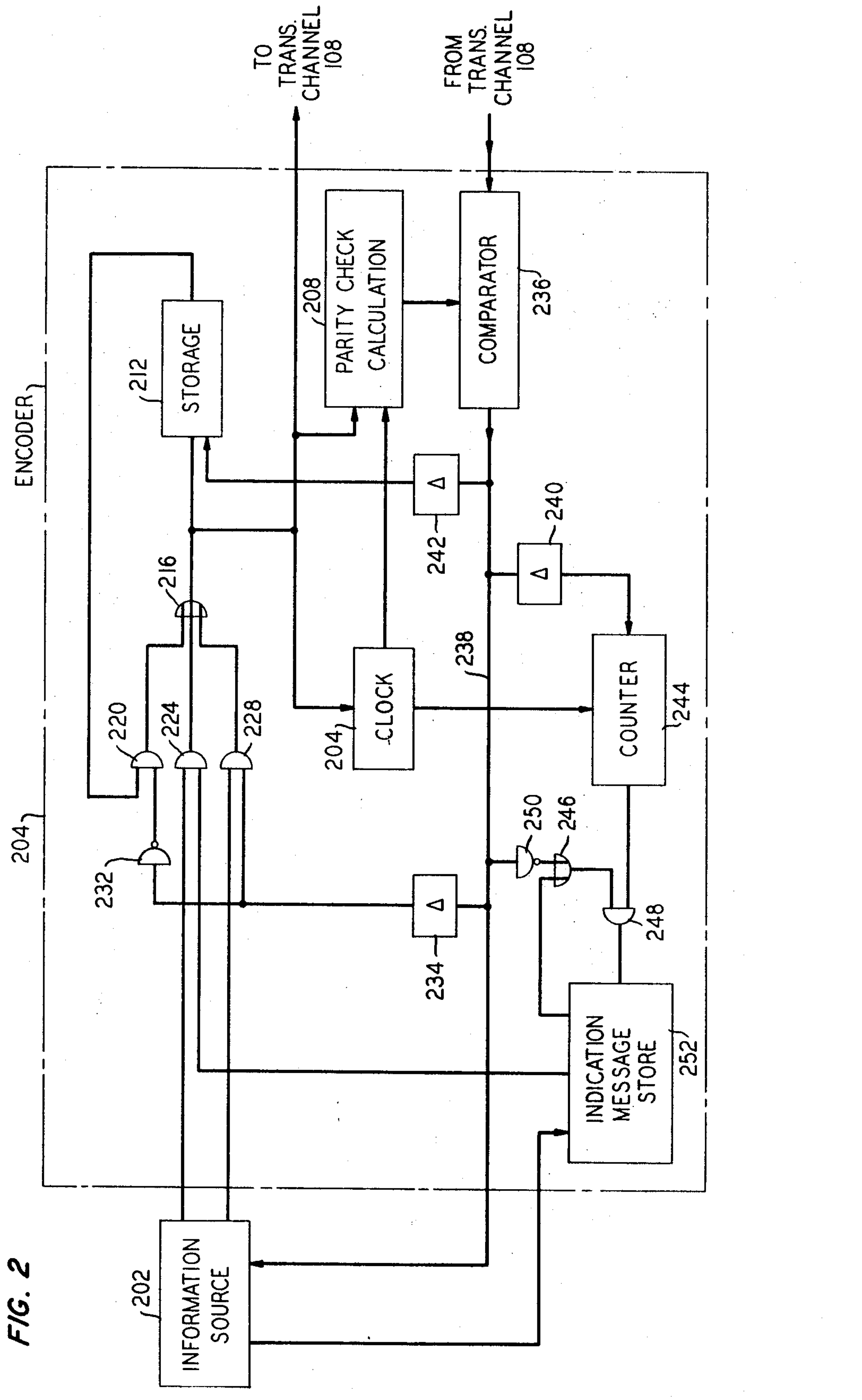
FIG. 2 shows an illustrative implementation of the encoder of FIG. 1.

The encoder of FIG. 2 begins operation with a comparator 236 applying a "high" signal to a lead 238. In response to the "high" signal on lead 238, an information source 202 applies a block of information characters or bits to an AND gate 228. Application of the information bits in conjunction with the "-high" signal on lead 238 enables AND gate 228 and transfers therethrough the information bits to an OR gate 216 and from there to a storage unit 212, to a parity check calculator 208, and to a transmission channel 108. The block of information bits are also applied to a clock 204, which, in response thereto, signals the parity check calculator 208 to calculate parity check digits for the block of information bits being applied thereto. Parity check calculation for block codes is well known in the prior art. See, for example, the aforecited Petersen text. The parity check digits calculated from the block of information bits are then applied to a comparator 236.

While parity check digits are being calculated by the encoder of FIG. 2, the information block is being transmitted via the transmission channel 108 to a parity check calculator 112 of a receiving terminal 132 shown in FIG. 1. There, the parity check calculator 112 calculates another set of parity check digits for the received block of information bits and transmits these parity digits via the reverse channel of the transmission channel 108 to the comparator 236 of FIG. 2. The comparator 236 then compares the parity check digits received from the parity check calculator 208 with the parity check digits received from the calculator 112. If they match (indicating correct transmission of the information block) the comparator 236 continues to apply a "high" signal to lead 238. If the parity check digits do not match (indicating incorrect transmission), the comparator 236 applied a "low" signal to lead 238. This signal inhibits the information source 202 from applying information blocks to the encoder. The "low" signal is also inverted to a "high" signal by an inverter 232 and applied to an AND gate 220. The "low" signal is also applied to the storage unit 212 thus causing the contents of the storage unit to be applied to the AND gate 220. (The signals to both the inverter 232 and the storage unit 212 are delayed by delay circuits 234 and 242 respectively—for reasons to be explained later.) The "high" signal from the inverter 232 in conjunction with the contents of the storage unit 212 enable the AND gate 220 thereby passing the contents of the storage unit 212 to OR gate 216 and then back to the storage unit 212, to the transmission channel 108, to the parity check calculator 208, and to the clock 204. Thus, in effect, the previously transmitted block of information bits which was found to be in error is retransmitted to the receiving terminal.

As each block of information bits is applied to the clock 204, the clock signals a counter 244 thereby increasing the count of the counter by one. In this manner, the counter 244 keeps a count of the number of information blocks which have been transmitted to the receiving terminal. When the comparator 236 generates a "low" signal following a mismatch of parity check digits, this "low" signal is inverted to a "high" signal by an inverter 250 and applied via an OR gate 246 to an AND gate 248. This signal, in conjunction with the contents of the counter 244, enables AND gate 248 thus passing the contents of the counter therethrough to an indication message store 252. Thus, when an information block is found to be in error, the position of this information block in the stream of transmitted blocks as indicated by the count in the counter 244 is stored in the indication message store 252.

To insure that the contents of the counter 244 is completely transferred to the store 252 before the counter is incremented by the retransmission of the erroneous block, the "low" signal to the inverter 232 and storage unit 212 which initiates the retransmission is delayed by the delay circuits 234 and 242. This delay enables the contents of the counter 244 to be transferred before the counter is incremented.

The counter 244 could be arranged to either count the total number of information blocks transmitted or to count the number of information blocks between erroneous information blocks. In the first case, the counter would simply continue to count each information block as it was transmitted, thus recording the total number of information blocks ultimately transmitted. In the latter case, when the comparator found a mismatch between parity check digits, the "low" signal from the comparator 236 would be applied via a delay circuit 240 to the counter 244 to reset the counter to begin counting anew the information blocks transmitted after detection of the erroneous information block. It will be assumed for this discussion, that the counter 244 is reset after each erroneous information block is discovered so that the counter only counts the information blocks between erroneous blocks. (The delay circuit 240 is inserted to prevent resetting of the counter 244 before its contents are applied to the indication message store 252.)

When the parity check digits are found to mismatch, the previously transmitted information block which is located in storage 212 is, as mentioned above, retransmitted and the parity check digits for the retransmitted block compared. If the retransmitted block is likewise found to be in error, then the block is again retransmitted. If the retransmitted block is found to be correct (i.e., the comparator 236 indicates a match), then the comparator 236 again applies a "high" signal to lead 238 indicating to the information source 202 that a new information block may be applied to the encoder.

The above process continues until all information blocks which the information source 202 is to transmit at this time have been applied to the encoder. The information source 202 then applied an END-OF-MESSAGE signal via AND gate 228 and OR gate 216 to the transmission channel 108 followed by signals to the indication message store 252 and to AND gate 224 causing the contents of the message store 252 to be applied via AND gate 224 and OR gate 216 to the storage unit 212, to the transmission channel 108 and to the parity check calculator 208. The contents of the indication message store are in the same form as the information blocks which the data source has applied to the encoder. That is, the indication message store contents would consist of one or more data blocks each containing one or more counts received from the counter 244. Arranging the counts into data blocks could be accomplished by simply providing the indication message store 252 with a sequence of shift registers, each being one data block in length. The first count information generated would be applied to the first shift register in the sequence and there stored. The next count information would also be applied to this first register providing the register had available storage. If the register did not have available storage, the next count information would be applied to the next register in the sequence, etc.

One block of characters at a time is applied by the indication message store 252 to the AND gate 224 (in response to a signal from the information source 202). In the above exemplary arrangement, this means that the contents of one shift register at a time would be applied to the AND gate 244. These blocks are treated the same as the information blocks from the information source. That is, parity check digits are calculated for each indication message store block and co compared in the comparator 236; a count is maintained in the counter 244 with respect to the indication message store blocks; etc. This process continues until the entire contents of the indication message store 252 have been transmitted to the receiving terminal. When the message store 252 is empty, it applies a signal to OR gate 246 causing the final count stored in the counter to be applied to the message store. The block containing this last count is then applied via AND gate 224 and OR gate 216 to the storage unit 212, to the channel 108, and to the parity check calculator 236. This block is treated just as the other blocks.

The receiving terminal 132 of FIG. 1 illustratively includes a tape unit 116 in which all messages received over the transmission channel 108 are sequentially stored on magnetic tape. The tape unit 116 might illustratively comprise a unit such as that described in Bycer, B. B., Digital Magnetic Tape Recording: Principles and Computer Applications, Hayden Book Co., Inc., 1965, pp. 208–249. After transmittal of all messages, the tape of the tape unit 116 is rewound and as it is rewound data messages stored thereon are read from the tape and applied to an indication message store 120. The indication message store 120 is engineered to store enough messages to insure that all indication messages likely to be received and read from the tape can be stored in the store. (It should be noted that reading the messages from the tape does not erase the messages.)

The first block applied to the indication message store 120 (containing the last count registered by the counter 244) must be correct as evident from the operation described above. This is so since the transmitting terminal would simply continue to transmit the last block until a correct block were received. Thus, the last block registered on the tape (which would be the first block read into the indication message store 120) must be correct. (This assumes, of course, that the error-correcting ability of the system is not exceeded.)

The first block read from the tape is immediately applied by the message store 120 to a translator 124 which translates the block into count information. In accordance with this information, the translator 124 then actuates a counter 128 to register a count equal to the last count registered and transmitted by the transmitting terminal. This count specifies the number of blocks between the last block stored on the tape and the first erroneous block encountered upon rewinding. The first erroneous block could be a block containing either indication messages or information messages. As each block after the first passes under the erase mechanism of the tape unit during rewinding, a clock pulse is applied via lead 134 to the counter 128 thereby decrementing the counter by one. This pulse is derived from a track on the tape itself. When the counter is decremented to a count of one, it applies an erase signal via lead 136 to the tape unit 116. The tape unit 116, in response to this signal, erases the next data block, i.e., that block after the block which caused the last decrement of the counter 128. The erased block corresponds to the first erroneous block encountered in rewinding the tape.

When the counter 128 is decremented to a count of one, it also applies a signal to the translator 124 causing the translator to actuate the counter to register a value equal to the next count in the indication block. The process described above is then repeated so that the next erroneous block is erased, etc.

After the translator 124 has activated the counter 128 in response to the last count information contained in the first indication message block translated, it signals the indication message store 120 to apply to the translator 124 the next indication message block. It then translates this block and commences to actuate the counter 128 in accordance with the count information of the second indication block. The translator 126 continues this operation until receipt and translation of the last count of the last information block. This last count merely indicates the number of blocks between the last erroneous block encountered upon rewinding and the first block which was registered on the tape. Thus this last count is not utilized in making an erasure.

In the above described manner, all erroneous data blocks are erased from the tape as the tape is rewound. The data on the tape thus consists only of correct information ready for delivery to a data utilization circuit 140.

What is claimed is:

1. An improved error control system including a source of information messages, a transmitting terminal comprising
   means for generating a first set of parity check digits for each of said information messages, and
   transmission means for applying said information messages to one end of a communication channel, and a receiving terminal connected to the other end of said communication channel comprising
   means for registering messages applied to said communication channel by said transmitting terminal,
   means for generating a second set of parity check digits for each message registered, and
   means for transmitting said second sets of parity check digits to said transmitting terminal,
   said transmitting terminal further comprising
   means for comparing each corresponding first and second set of parity check digits, and
   retransmission means for reapplying to said channel that information message whose first and second set of parity check digits do not match, said transmission means including said retransmission means, wherein the improvement comprises
   means at said transmitting terminal for generating and registering indication messages identifying those information messages whose first and second set of parity check digits do not match, and
   means at said transmitting terminal for applying said indication messages to said communication channel following the application of all of said information messages to said channel and
   said receiving terminal further comprises means connected to said channel for processing said indication messages and for removing from said receiving terminal registering means those information messages identified by said indication messages.

2. The system of claim 1, wherein said receiving terminal-registering means comprises magnetic tape apparatus for storing received messages on a magnetic tape reel and for rewinding said tape reel at the termination of transmission of messages, and wherein said processing and removing means comprises apparatus for signaling said tape unit to erase those information messages identified by said indication messages as said tape reel is rewound.

3. In an error control system including a source of data messages, an encoder comprising
   storage means for temporarily storing data messages,
   means for transmitting data messages to a receiving terminal,
   means for generating parity check digits for data messages,
   means for applying data messages from said source to said storage means, said transmitting means, and said generating means,
   comparing means for comparing parity check digits generated for a data message by said generating means with parity check digits generated for said data message at the receiving terminal and received therefrom by the comparing means,
   means responsive to said comparing means for signaling said storage means to reregister said data message and to apply said data message to said transmitting means and said generating means upon the occurrence of a mismatch between the parity check digits generated by said generating means and the parity check digits generated at the receiving terminal,
   means responsive to said comparing means for generating and registering an identification signal for each data message upon the occurrence of said mismatch, and
   means for applying said identification signals to said storage means, said transmitting means, and said generating means after all information messages have been transmitted.

4. The encoder of claim 3, wherein said identification registering means comprises
   a clock for generating a signal each time an information message or identification message is applied to said storage means, said transmitting means, and said generating means,
   a counter for counting said clock signals and for generating a signal representative of the count registered upon the occurrence of said mismatch, wherein the counter is reset after said representative signal is generated, and
   representative signal registering means for registering each of said representative signals.

5. The system of claim 3, further including a receiving terminal comprising
   means for generating parity check digits for information messages and identification messages received from said encoder and for applying such check digits to said channel for transmission to said encoder,
   means for storing information messages and identification messages received from said encoder, and
   means for removing the information messages specified by said identification messages from said receiving terminal storing means.

6. A system as in claim 5, wherein said receiving terminal storage means comprises a magnetic tape unit in which received information and identification messages are stored on a tape reel and wherein said processing and removing means comprises apparatus for signaling said storage unit to erase information messages specified by said identification messages from said tape reel as said reel is rewound after termination of transmission.

7. A system as in claim 5 wherein said receiving terminal storage means comprises a magnetic tape storage unit including a tape reel for storing information messages and identification messages, apparatus for rewinding said tape reel upon the termination of transmission and for generating a signal as each message passes under the erase mechanism of said storage unit, and apparatus for reading messages from said tape reel as said reel is rewound, identification message storage means for storing the identification messages read from said tape reel as said tape reel is rewound, a translator for translating said identification messages into counter-actuating signals, and a counter responsive to said translator for registering a count indicated by said counter-actuating signals, for decrementing the registered count by one in response to the signals generated by the tape unit, and for signaling said tape unit to erase the information message passing under the erase mechanism upon the counter reaching a count of one.

8. An improved method for controlling errors in a data transmission system having both forward and reverse channels wherein parity check digits for an information message are generated at a transmitting terminal and there stored, the information message is transmitted to a receiving terminal and there stored, parity check digits for the received information message are generated ta the receiving terminal and transmitted to the transmitting terminal, the received digits are compared with the stored digits at the transmitting terminal, and the said information message is retransmitted if the parity check digits do not agree and a next information message is transmitted if the parity check digits agree, wherein said improvement comprises the steps of storing an indication of the information message retransmitted, transmitting the stored indications after all information messages have been transmitted, and removing those information messages specified by said indications from the receiving terminal storage.

9. The method of claim 8, wherein the messages received at the receiving terminal are stored in a magnetic tape unit on a tape reel, and wherein the removing step comprises the steps of rewinding said tape reel after all information messages and indications have been transmitted and erasing the information messages specified by said indications as said tape reel is rewound.

10. The method of claim 9 wherein said erasing step comprises the steps of reading said indications from said tape reel, translating said indications into counter-actuating signals, actuating a counter to register a count specified by an indication, decrementing the counter by one count each time a message passes under the erase mechanism of said tape unit, and signaling the tape units to erase a message when the counter reaches a count of one.

11. In an improved data transmission system including a transmitter, a receiver, and a channel interconnecting said transmitter and receiver comprising a source of information messages at said transmitter, control means at said transmitter for controlling said source of information messages, transmitter check signal generating and registering means responsive to said control means for generating and registering a first set of information message check signals for each information message, transmitting means responsive to said control means for applying said information messages to said channel for transmission to said receiver, receiver check generating means at said receiver for generating a second set of information message check signals for each information message received from said channel, means at said receiver for applying said second set of information message check signals to said channel for transmission to said transmitter, comparing means at said transmitter for comparing said second set of information message check signals received from said channel with said first set of information message check signals generated and registered at said transmitter and retransmitting means for reapplying said information messages to said transmitting means for transmission to said receiver in response to signals generated at said comparing means upon failure of said first and second sets of information message check signals to match, wherein said improvement comprises means responsive to said comparing means for generating and storing indication messages identifying those information messages whose first and second sets of information message check signals do not match.

12. Apparatus according to claim 11 wherein said transmitter check signal generating and registering means includes means for generating a first set of indication message check signals for each indication message.

13. Apparatus according to claim 12 wherein said transmitting means further includes means for applying said indication messages to said channel for transmission to said receiver.

14. Apparatus according to claim 13 wherein said receiver check generating means includes means connected to said channel for generating a second set of indication message check signals for each indication message received from said channel.

15. Apparatus according to claim 14 wherein said means at said receiver for applying said second set of information message check signals to said channel for transmission to said transmitter includes means for applying said second set of indication message check signals to said channel for transmission to said transmitter.

16. Apparatus according to claim 15 wherein, said comparing means further includes means for comparing said second set of indication message check signals with said registered first set of indication message check signals.

17. Apparatus according to claim 16 wherein said retransmitting means further includes means for reapplying said indication message to said transmitting means upon failure of said first and second sets of indication message check signals to match.

18. Apparatus according to claim 17 wherein said receiver further includes storage means connected to said channel for storing said information and indication messages received from said transmitter, 19. Apparatus according to claim 18 wherein said receiver further includes removing means for removing from said storage means those information and indication messages indicated by said indication messages to have produced first and second check sets which do not match.

20. The combination of claim 19 wherein said receiver storage means comprises a magnetic tape unit including a tape reel for storing said received messages and wherein said removing means comprises apparatus for signaling said tape unit to erase those information and indication messages identified by said indication messages as said tape reel is rewound following transmission of all messages.